US006993347B2

(12) United States Patent
Bodin et al.

(10) Patent No.: US 6,993,347 B2
(45) Date of Patent: Jan. 31, 2006

(54) DYNAMIC MEDIA INTERLEAVING

(75) Inventors: William Kress Bodin, Austin, TX (US); Derral Charles Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 10/322,056

(22) Filed: Dec. 17, 2002

(65) Prior Publication Data

US 2004/0203898 A1 Oct. 14, 2004

(51) Int. Cl.
*H04Q 7/20* (2006.01)

(52) U.S. Cl. ............... 455/456.3; 455/414.1; 455/414.2

(58) Field of Classification Search ............ 455/456.3, 455/418–419, 575.9, 550.1, 414.3, 3.01–3.04, 455/414.1, 414.2
See application file for complete search history.

(56) References Cited

U.S. PATENT DOCUMENTS

| 4,868,866 | A | 9/1989 | Williams, Jr. .................. 707/9 |
|---|---|---|---|
| 5,168,363 | A | 12/1992 | Kojima et al. .............. 358/183 |
| 5,173,900 | A | 12/1992 | Miller et al. ................ 370/487 |
| 5,239,419 | A | 8/1993 | Kim ......................... 360/14.1 |
| 5,260,778 | A | 11/1993 | Kauffman et al. ............ 725/33 |
| 5,379,345 | A | 1/1995 | Greenberg ................. 455/2.01 |
| 5,432,542 | A | 7/1995 | Thibadeau et al. ........... 725/35 |
| 5,473,371 | A | 12/1995 | Choi ......................... 348/239 |
| 5,675,783 | A | 10/1997 | Sasaki ........................ 707/100 |
| 5,719,786 | A | 2/1998 | Nelson et al. .............. 709/219 |
| 5,825,967 | A | 10/1998 | Stewart et al. ................ 386/52 |
| 5,907,793 | A | 5/1999 | Reams ....................... 725/122 |
| 5,929,849 | A | 7/1999 | Kikinis ....................... 725/113 |
| 6,175,840 | B1 | 1/2001 | Chen et al. ................. 707/501 |
| 6,192,340 | B1 | 2/2001 | Abecassis ................... 704/270 |
| 6,201,536 | B1 | 3/2001 | Hendricks et al. .......... 345/327 |
| 6,725,022 | B1 * | 4/2004 | Clayton et al. .......... 455/154.1 |
| 6,727,847 | B2 * | 4/2004 | Rabinowitz et al. ... 342/357.06 |
| 6,728,531 | B1 * | 4/2004 | Lee et al. ................... 455/419 |
| 6,799,201 | B1 * | 9/2004 | Lee et al. ................... 709/217 |
| 6,829,475 | B1 * | 12/2004 | Lee et al. ................... 455/419 |
| 2001/0012436 | A1 | 8/2001 | Nakaya ....................... 386/52 |
| 2001/0031131 | A1 | 10/2001 | Fukai et al. .................. 386/52 |
| 2002/0012050 | A1 | 1/2002 | Oka et al. ................... 348/211 |

FOREIGN PATENT DOCUMENTS

| JP | 62167699 | 7/1987 |
|---|---|---|
| JP | 10144056 A | 5/1998 |

OTHER PUBLICATIONS

IBM Dossier, ARC91999 0244; "System and Technique for Dynamically Interjecting Multimedia Messages in the Context of Real-Time (Internet Model) Discourse" Dec. 5, 2000.

(Continued)

*Primary Examiner*—Sonny Trinh
(74) *Attorney, Agent, or Firm*—H. Artoush Ohanian; Mark S. Walker; Biggers & Ohanian, LLP

(57) ABSTRACT

Interleaving preferred location specific content into broadcast content including providing a location of the client device to the source of preferred location specific content; receiving broadcast content in the client device; receiving preferred location specific content in the client device at a wireless network address; identifying insertion points for preferred location specific content within the broadcast content; inserting preferred location specific content into broadcast content at the identified insertion points.

18 Claims, 6 Drawing Sheets

OTHER PUBLICATIONS

IBM Dossier, JP9 2000 0397; "Method and System for Creating VoiceXML File Automatically" Apr. 27, 2001.

IBM Dossier, SOM9 2000 0004; "Method and Apparatus for Integrated Real-Time Interactive Content Insertion and Monitoring in E-Commerce Enabled Interactive Digital TV" May 2, 2000.

IBM Dossier, YOR9 1997 0398; "System for Two-Way Digital Multimedia Digital Multimedia Broadcast and Interactive Services" July 25, 2000.

IBM Dossier, YOR9 1998 0068; "A Data Annotation System for Digital Video Streams" Jul. 25, 2000.

IBM Technical Disclosure Bulletin: "Video Tape Recoder with Hard Disk Drive;" Oct., 1995; vol. 38, No. 10; pp. 577-578.

Lockerd, et al; "LAFCam—Leveraging Affective Feedback Camcorder,", no date.

Research Disclosure; "Multiple—Search of Video Segments Indexed by Time—Alligned Annotations of Video Content;" Mar., 2000; No. 431191; p. 603.

* cited by examiner

User Preference Record ~ 106

User ID ~ 404
Priority ~ 406
Preference ~ 408

LSC Record ~ 118

Digital content ~ 412
Content type ~ 414
Target location ~ 416
Duration ~ 418
Relevant date range ~ 420
Relevant time range ~ 422

PLSC Record ~ 120

User ID ~ 404
NetworkAddress ~ 405
Digital content ~ 412
Duration ~ 418

Figure 4

DYNAMIC MEDIA INTERLEAVING

BACKGROUND OF THE INVENTION

1. Field of the Invention

The field of the invention is data processing, or, more specifically, methods, systems, and products for dynamic media interleaving.

2. Description of Related Art

Radio broadcasts include program content as well as news, sports, weather, stock quotes, local interest items, public service announcements, advertising, and so on. None of the non-program content is location specific, nor is it organized according to the preferences of individual listeners. It would be advantageous, however, if such content could be organized, interleaved into preexisting program content, and presented to listeners in accordance with the listeners' present physical location as well as the listeners' personal preferences.

SUMMARY OF THE INVENTION

Embodiments of the present invention provide methods and means for interleaving preferred location specific content into broadcast content including providing a location of the client device to the source of preferred location specific content; receiving broadcast content in the client device; receiving preferred location specific content in the client device at a wireless network address; identifying insertion points for preferred location specific content within the broadcast content; inserting preferred location specific content into broadcast content at the identified insertion points. Exemplary embodiments typically also include providing to a source of preferred location specific content the wireless network address for the client device. Exemplary embodiments typically also include providing user preferences to the source of preferred location specific content. In typical embodiments, user preferences are represented by user preference records comprising data elements describing user preferences, optionally including priority.

Exemplary embodiments often also include receiving in the mobile client device a broadcast schedule for the broadcast content where the broadcast schedule contains identifications of insertion points for preferred location specific content within the broadcast content and identifying insertion points for preferred location specific content within the broadcast content includes reading identifications of insertion points from within the broadcast schedule. Exemplary embodiments often also include selecting, in the mobile client device, preferred location specific content for insertion into broadcast content. In such embodiments, selecting preferred location specific content is typically carried out in dependence upon duration, relevant date range, and relevant time range, and optionally also in dependence upon priority.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 4 illustrates example data structures for user preference records, location specific content records, and preferred location specific content records.

DETAILED DESCRIPTION OF EXEMPLARY EMBODIMENTS

Introduction

Figure 1:
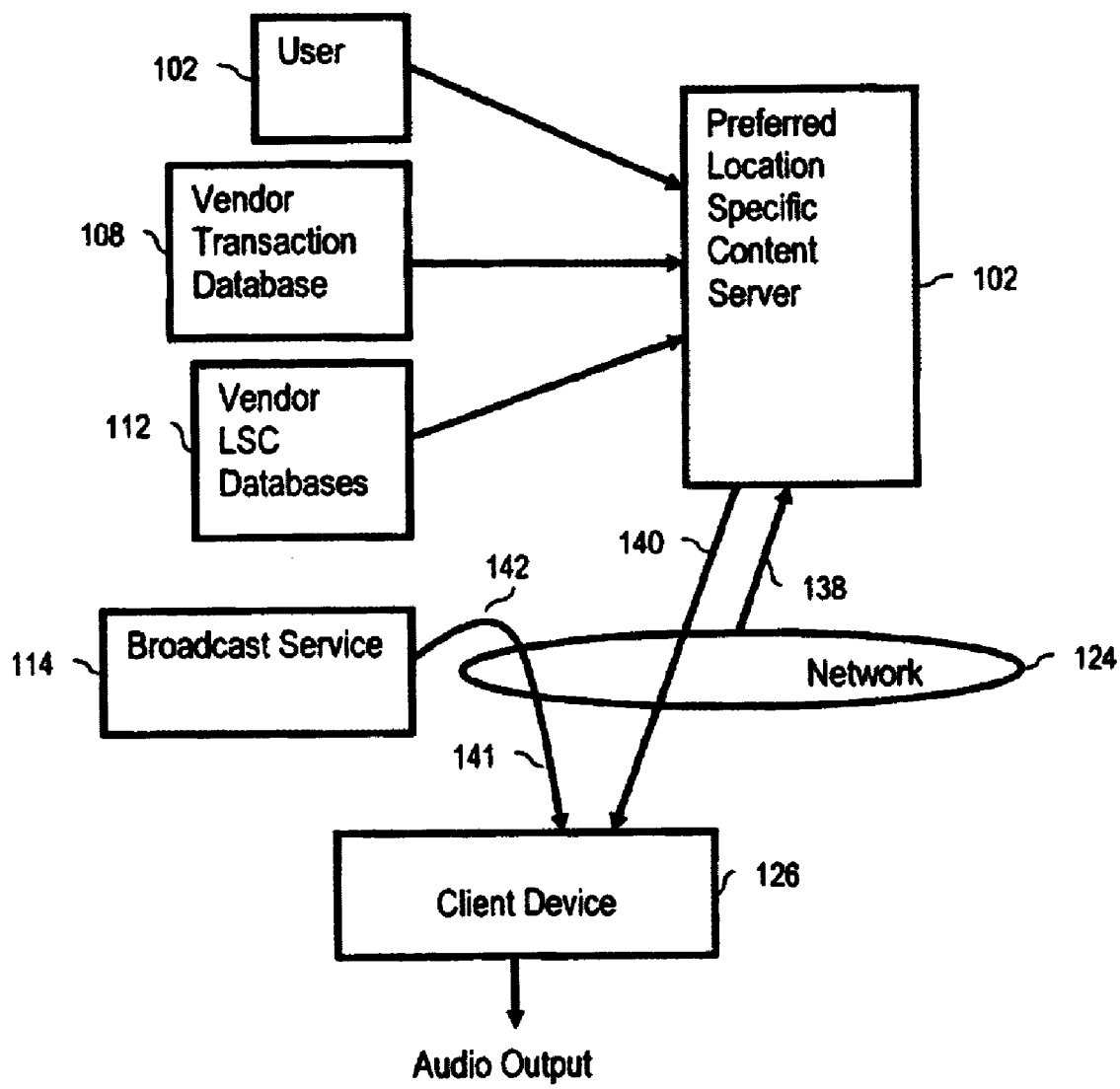
FIG. 1 is a block diagram of an exemplary embodiment of a system for interleaving location specific content.

The present invention is described to a large extent in this specification in terms of methods for dynamic media interleaving. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the following terms are used as defined here. Other terms are defined elsewhere in the specification and used as defined.

In this specification, the terms "field," "data element," and "attribute" are used as synonyms, referring to individual elements of digital data. Aggregates of data elements are referred to as "records" or "data structures." Aggregates of records are referred to as "files" or "tables." Aggregates of files are referred to as "databases." Definitions of complex data structures that include member methods, functions, or software routines in addition to data elements are referred to as "classes." Instances of complex data structures are referred to as "objects" or "class objects."

"Browser" means a web browser, a software application for locating and displaying web pages. Browsers typically comprise both a markup language interpreter, web page display routines, and an HTTP communications client. Typical browsers today can display text, graphics, audio and video. Browsers are operative in web-enabled devices, including wireless web-enabled devices. Browsers in wireless web-enabled devices often are downsized browsers called "microbrowsers." Microbrowsers in wireless web-enabled devices often support markup languages other than HTML, including for example, WML and HDML.

"Coupled for data communications" means any form of data communications, wireless, infrared, radio, internet protocols, HTTP protocols, email protocols, networked, direct connections, dedicated phone lines, dial-ups, serial connections with RS-232 or Universal Serial Buses, hard-wired parallel port connections, and other forms of data communications as will occur to those of skill in the art.

Couplings for data communications wireless modems using analog cellular channels, and communications using CDPD, Cellular Digital Packet Data. Couplings for data communications include wireless access points, wireless network ports according to IEEE standard 802.11, and Bluetooth piconet ports as standardized by the Bluetooth Special Interest Group, and HomeRF ports as standardized by the HomeRF Working Group, as well as infrared ports. Couplings for data communications include Bluetooth piconets implemented in accordance with the well known de facto industry standard known as the "Bluetooth Specification," a specification for short range radio links among mobile personal computers, mobile phones, and other portable devices.

"HTML" stands for 'HypterText Markup Language,' a standard markup language for displaying web pages on browsers.

"HTTP" stands for 'HyperText Transport Protocol,' the standard data communications protocol of the World Wide Web.

"LSC" abbreviates "location specific content."

The term "network" is used in this specification to mean any networked coupling for data communications. Examples of networks useful with the invention include intranets, extranets, internets, local area networks, wide area networks, and other network arrangements as will occur to those of skill in the art. The use of any networked coupling among client devices and content servers or other sources of content and devices coupled through designated network addresses is well within the scope of the present invention. In embodiments of the kind illustrated, both client devices and sources of content or content servers typically include devices implemented as automated computing machinery, data communications software such as web browsers or microbrowsers as internet clients having network addresses. There is no requirement within the present invention, however, that any client device or content server have any particular kind of network address.

"Network address" means any network address useful to locate a client device or a designated network address on any network. Network address includes any internet protocol address useful to locate an internet client, a browser, a microbrowser, or a designated network address on the Internet or a wireless digital network. Network addresses useful with various embodiments of the invention include without limitation local internet protocol addresses, private internet protocol addresses, and temporary Internet addresses assigned to a web client by a DHCP server, and permanent, official registered Internet addresses associated with domain names.

"PLSC" abbreviates "preferred location specific content." It is usual in patent specifications to use the word "preferred" to refer to exemplary embodiments of an invention. In this specification, however, "preferred" is a quality of location specific content for downloading to client devices for interleaving into broadcast content.

"Satellite radio" refers to satellite radio sets capable of receiving satellite radio broadcasts or to satellite radio broadcasts of the kind provided by, for example, XM Satellite Radio, Inc., or Sirius Satellite Radio, Inc.

"Server" in this specification refers to a computer or device comprising automated computing machinery on a network that manages network resources. A "web server" in particular is a server that communicates with browsers by means of HTTP in order to manage and make available to networked computers markup language documents and digital objects. The term "content server" in this specification usually refers to a server functioning as a networked source of preferred location specific content.

A "store" is one or more storage locations in computer memory. "Storing" is writing data to storage locations in computer memory, typically implemented by a processor operating under stored program control.

"URL" means Uniform Resource Locator, a standard method of associating World Wide Web data locations with network addresses for data communications.

"World Wide Web," or more simply "the web," refers to the system of internet protocol ("IP") servers that support specially formatted documents, documents formatted in a language called "HTML" for HyperText Markup Language. The term "web" is used in this specification also to refer to any server or connected group or interconnected groups of servers that implement the HyperText Transport Protocol, "HTTP," in support of URLs and HTML documents, regardless whether such servers or groups of servers are coupled to the World Wide Web as such.

A "web site" is a location on the World Wide Web. Web sites are identified by domain names that resolve to Internet addresses. Web sites include storage locations identifiable by URLs. Web sites are implemented in, on, and as part of web servers, that is, HTTP servers. Web sites are aggregations of computer software installed and operating on computer hardware.

"TDMA" stands for Time Division Multiple Access, a technology for delivering digital wireless service using time-division multiplexing. TDMA works by dividing a radio frequency into time slots and then allocating slots to multiple calls. In this way, a single frequency can support multiple, simultaneous data channels. TDMA is used by GSM.

"GSM" stands for Global System for Mobile Communications, a digital cellular standard. GSM is a de facto standard for wireless digital communications in Europe and Asia. GSM is a so-called second generation, or '2G,' wireless network infrastructure technology. GSM is built on TDMA.

"CDPD" stands for Cellular Digital Packet Data, a data transmission technology developed for use on cellular phone frequencies. CDPD uses unused cellular channels to transmit data in packets. CDPD supports data transfer rates of up to 19.2 Kbps.

"GPRS" stands for General Packet Radio Service, a standard for wireless data communications representing a packet radio upgrade to GSM. GPRS runs at speeds up to 150 Kbps, compared with current GSM systems which support no more than about 9.6 Kbps or 14.4 Kbps. GPRS, which supports a wide range of speeds, is an efficient use of limited bandwidth and is particularly suited for sending and receiving small bursts of data, such as e-mail and web browsing, as well as large volumes of data. GPRS is an interim step on the way to UMTS and is therefore referred to as a '2.5G' technology.

"EDGE" stands for Enhanced Data Rates for GSM Evolution, a standard for wireless data communications supporting data transfer rates of more than 300 Kbps. GPRS and EDGE, like GPRS, is considered an interim step on the road to UMTS and is therefore referred to as '2.5G' technology.

"UMTS" stands for Universal Mobile Telecommunication System, a standard for wireless data communications supporting data transfer rates of up to 2 Mpbs. UMTS has variant coding standards including, for example, W-CDMA and cdma2000. 'CDMA' stands for Code Division Multiple Access and W-CDMA for Wideband Code Division Multiple Access. UMTS/CDMA is the third generation, or '3G,' wireless network infrastructure technology toward which GPRS and EDGE are interim steps. 'FOMA,' meaning Freedom of Mobile Multimedia Access, is a 3G W-CDMA wireless network technology implemented in Japan.

Cdma2000 variants 'cdma2000 1X,' '1X-EV-DV,' '1X EV-DO,' and 'cdma2000 3X' also deliver 3G services while occupying reduced radio spectrum, only 1.25 MHz per carrier as opposed to W-CDMA which requires entirely new radio spectrum for wireless network installation. Because of their reduced radio spectrum requirements, variants of cdma2000 are considered somewhat more technologically advanced than the W-CDMA standard. Cdma2000 can be defined to operate not only in the new spectra dedicated to W-CDMA but also in existing cellular and personal communications spectra already dedicated to older CDMA, TDMA, and GSM wireless network services.

"Bluetooth" refers to the Bluetooth Specification, a specification for short range radio links among mobile personal computers, mobile phones, and other portable devices. "802.11(b)" refers to IEEE standard number 802.11(b), a standard of wireless local area network communications.

"HomeRF" refers to the Home Radio Frequency LAN standard promulgated by the HomeRF Working Group. HomeRF is designed to be more affordable for homes, as contrasted with 802.11(b) which was designed for business use.

Providing Preferred Location Specific Content

Turning now to FIG. 1, an exemplary embodiment of the invention is illustrated in a system for interleaving preferred location specific content into broadcast content. The illustrated example system includes a preferred location specific content ("PLSC") server (102) having inputs from users (102), who in typical embodiments are enabled to input directly their programming preferences. The illustrated example system includes input to the PLSC server from vendor transaction databases (108) which themselves are data mined to discover user programming preferences. The illustrated example system of FIG. 1 includes provisions for inputs from vendor location specific content ("LSC") databases (114), which databases comprise the sources of location specific content in typical embodiments.

The example system of FIG. 1 includes client devices (126) (one shown), typically FM radios or satellite radios having interleaving capabilities, although other client devices may occur to persons of skill in the art, and the use of any client device capable of accepting broadcast programming and interleaving it with PLSC is well within the scope of the present invention. FIG. 1 also illustrates the provision of a broadcast to a client device (126) from a broadcast service (114) such as, for example, an AM radio broadcast, an FM radio broadcast, or a satellite radio broadcast. Typical exemplary client devices, as shown in more detail in FIGS. 2 and 3, include computer memory for storing broadcast schedules (130), computer memory storage for PLSC (132), and one or more computer processors programmed to interleave (134) PLSC into broadcast program content (128) in dependence upon a broadcast schedule (130).

An example of a large class of embodiments of client devices of the present invention is portable or mobile radio receivers (AM, FM, XM, others, or any combination of these) having integrated cellular telephones implementing backchannels (142, 140) as well as computer processors and computer memory implementing PLSC storage (132), broadcast schedule storage (130), and interleaving (134). The interleaving function also varies across embodiments with the kind of digital content in the PLSC records. To the extent that PLSC records (132) include wav clips, interleaving (134) includes converting wav clips to audio. To the extent that PLSC records (132) include text, interleaving (134) includes text-to-audio conversion.

The broadcast schedule (130) in typical embodiments includes times when interleave slots are available for insertion of PLSC into broadcast program content as well as the duration of such slots. As discussed in more detail below, the downloaded PLSC records (132) typically include an indication of duration for each record of PLSC, and the PLSC records in many embodiments are downloaded in priority order. Interleaving (134) in such embodiments, then, comprises selecting from a PLSC queue (132) the first PLSC record having digital content with a duration equal to or less than the duration indicated in the broadcast schedule for the next interleave slot in the broadcast content.

In typical embodiments, the broadcast schedules (130), the PLSC records, and the location of the client device are communicated through backchannels. "Backchannel" refers to a two way digital coupling for data communications with a client device. Backchannels often support two-way communications. In fact, the term "backchannel" has about it the implication that it is a way for users or client devices to communicate back to content providers. Backchannels typically are not the 'main channel,' the channel through which a broadcast service broadcasts broadcast program content to client devices. Backchannels useful with various embodiments of the present invention are implemented through the use of GSM, GPSR, EDGE, UMTS, Bluetooth, HomeRF, or 802.11(b). Other implementations of backchannels will occur to those of skill in the art. The use of any backchannel capable of providing digital communications with client devices is well within the scope of the present invention.

The illustrated example system of FIG. 1 includes backchannel couplings for data communications across a digital communications network (124). The couplings include a backchannel (142) for downloading broadcast schedules from a broadcast service to a client device (126), a backchannel (140) for downloading PLSC from a PLSC server (102) to a client device (126), and a backchannel (138) for uploading to a PLSC server a location (116) of a client device.

In typical embodiments of the present invention, it is a capability of the digital communications network (124) to return to the PLSC server (138) a location of any client device coupled to the PLSC server (102) through the network (124). In fact, for networks providing cellular telephone communications, under the regulations of the Federal Communications Commission in the United States, this capability generally is legally required. Networks having this capability include any digital communications network implemented using GSM, GPSR, EDGE, UMTS, Bluetooth, HomeRF, or 802.11(b). Other network technologies having this capability will occur to those of skill in the art, and the use of all such network technologies is well within the scope of the present invention.

Figure 2:
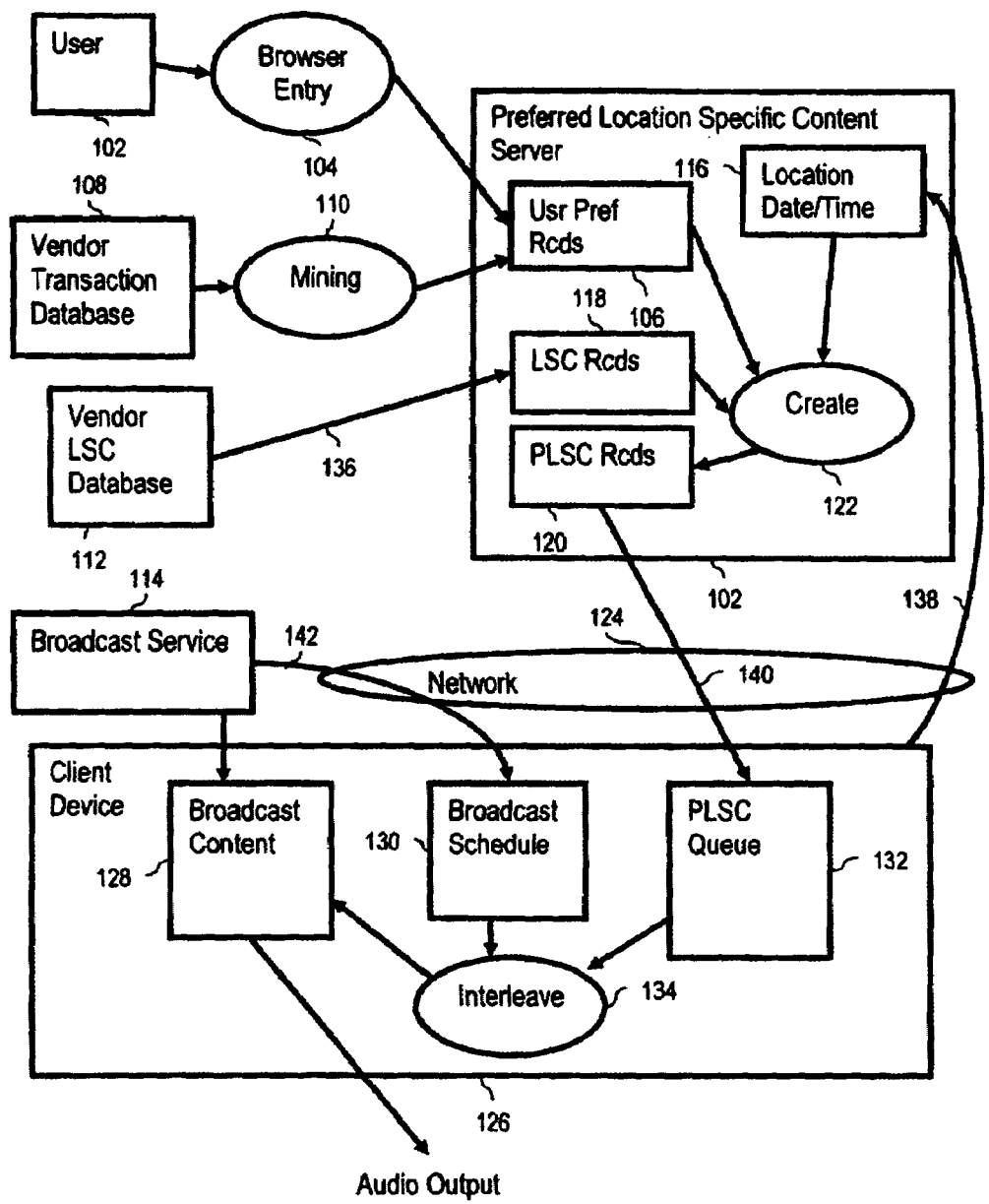
FIG. 2 is a control flow diagram of an exemplary embodiment of a system for interleaving location specific content.
Figure 3:
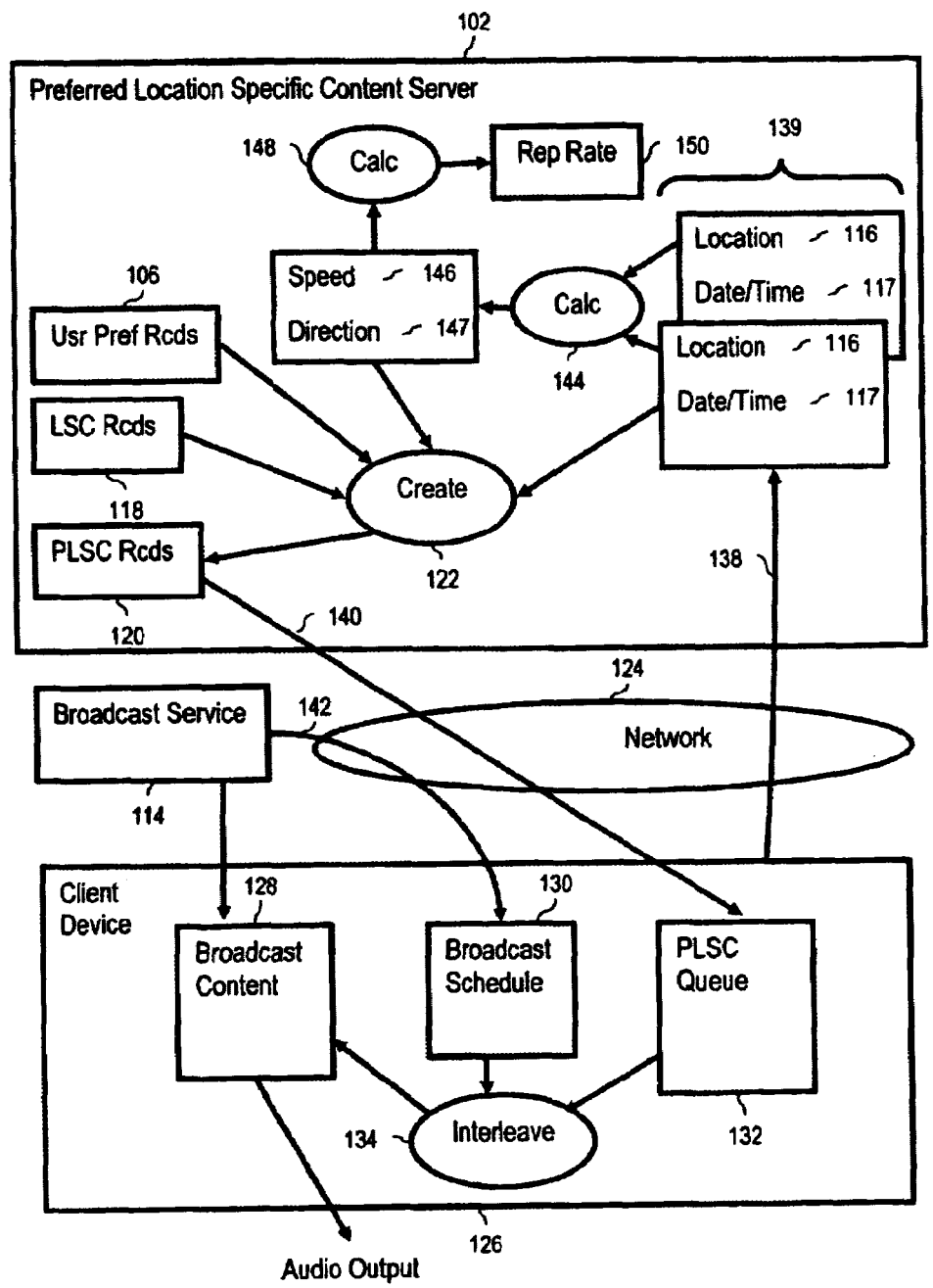
FIG. 3 is a control flow diagram of a further exemplary embodiment of a system for interleaving location specific content.

Although FIGS. 1, 2, and 3 show example embodiments in which a backchannel (142) to a broadcast service (114) is used to download broadcast schedules, in alternative embodiments, the broadcast schedules are stored on the PLSC server and downloaded to the client device through the same backchannel (140) used to download PLSC to the client device. In such alternative embodiments (not shown), PLSC servers have couplings for data communications with broadcast services through which are downloaded broadcast schedules for storage on PLSC servers.

Figure 1A:
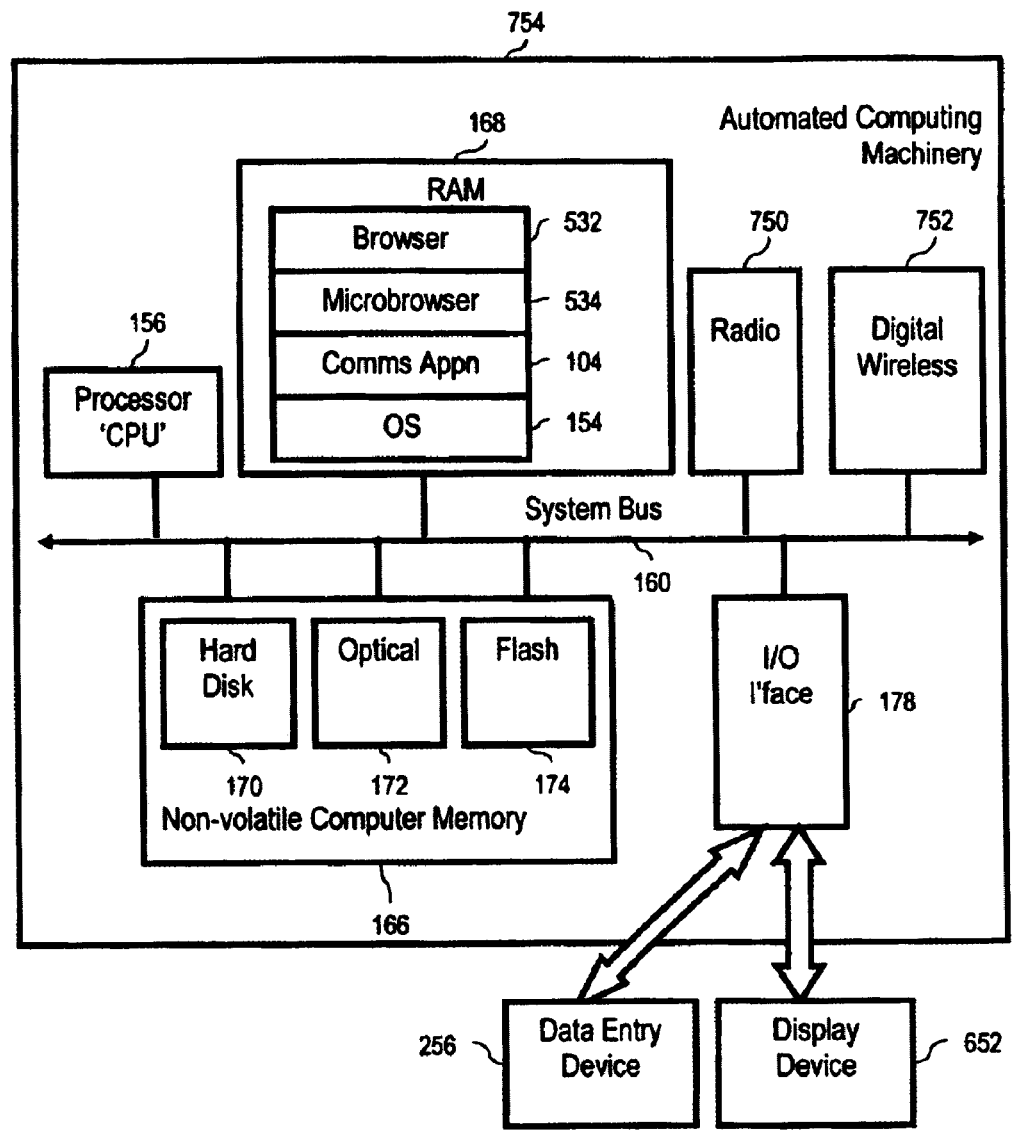
FIG. 1a sets forth a block diagram of automated computing machinery useful in most embodiments of the present invention.

Both client devices and web servers upon which content servers are implemented typically comprise automated computer machinery (754) having elements such as those illustrated in FIG. 1a. FIG. 1a sets forth a block diagram of automated computing machinery (754) that includes a computer processor or 'CPU' (156). The exemplary automated computer machinery (754) of FIG. 1a includes random access memory (168) ("RAM").

Stored in RAM (168), in this example of useful automated computing machinery, is a communications application program (104) and an operating system (154). Examples of communications application programs useful with various embodiments of the invention include HTTP communications programs such as web server software for web servers and browsers and microbrowsers for client devices. Examples of operating systems useful with various embodiments of servers and client devices according to the present invention include Microsoft's DOS, Microsoft's NT™, Unix, Linux, and others as will occur to those of skill in the art. The use of any operating system, or no operating system, is within the scope of the present invention.

In addition to RAM, the exemplary automated computer machinery (754) of FIG. 1a includes non-volatile computer memory (166). Non-volatile computer memory (166) can be implemented as hard disk space (170), optical drive space (172), electrically erasable programmable read-only memory space (so-called 'EEPROM' or 'Flash' memory) (174), or as any other kind of computer memory, as will occur to those of skill in the art, capable of receiving and storing software and computer data, including communications applications programs such as browsers, microbrowsers, and HTTP server software; security objects; operating systems; broadcast content, broadcast schedules, and preferred location specific content.

The automated computer machinery (754) of FIG. 1a includes an input/output interface (178) capable of providing input from data entry devices (256) and output to display devices (652). Data entry devices (256) include mice, touch-sensitive screens, keyboards, and so on. Display devices (652) include video screens on personal computers, liquid crystal screen on wireless handheld devices, audio speakers, television screens, and so on. To the extent that a data entry device (256) and a display device (652) on the same client device or web server comprise a touch-sensitive screen, then a data entry device (256) and a display device (652) can be the same physical device. Data entry devices and display devices both implement or utilize GUIs or character-based user interfaces. Automated computer machinery (754) as illustrated in FIG. 1a typically includes also a radio receiver (750) and a coupling for wireless digital network communications (752) for additional input/output support. Other hardware components of automated computing machinery often used in client devices and web servers but not shown on FIG. 1a include wired Ethernet cards, wireless LAN cards for 802.11 or Bluetooth wireless connections, and USB (Universal Serial Bus) ports.

Turning now to FIG. 2, exemplary embodiments of the invention are shown as methods of providing preferred location specific content (120, 132) for interleaving (134) into broadcast content (128). Embodiments of such methods typically are implemented upon a content server (102). In exemplary embodiments, the content server typically includes at least one computer processor and computer memory, the processor coupled to the computer memory. In most embodiments, the content server is coupled for data communications through a digital communications network (124) to a user client device (126); the user client device is typically associated in the content server with a particular user; and the particular user is typically represented in the content server by a user account record. In exemplary embodiments, the user account record typically includes data elements comprising a user identification identifying the user, and a network address for the user's user client device within the digital communications network. In such embodiments the user client device is typically associated in the content server with an address in the digital communications network, the digital communications network having the capability of providing the present location (116) of the user client device.

As illustrated in FIG. 2, exemplary embodiments of the invention typically include storing user preferences in user preference records (106), storing location specific content (LSC) in LSC records (118), and receiving (138), from the digital communications network, a location (116) of the user client device. Some embodiments read the local date and time at the location of the client device from the network or from the client device. Other embodiments calculate the local date and time at the location of the client device by using the location of the client device, the location of the PLSC server, and the local time at the location of the PLSC server to make the calculation (not shown).

Further exemplary embodiments include determining local date and time (116) at the location of the user client device, creating (122) preferred location specific content (PLSC) records (120) in dependence upon the LSC records, the user preferences, the location of the user client device, and the local date and time at the location of the client device. More specifically, PLSC records are created in blank, and LSC record to be converted into PLSC records are selected on the basis of user preferences, the location of the user client device, and the local date and time at the location of the client device.

The process of creating PLSC records is completed by copying from the selected LSC records pertinent data fields for inclusion in the PLSC records, including, for example, a user ID so that a client device network address can be found for use at download time, the digital content to be downloaded, interleaved into program content, and played upon a client device, and the duration of the digital content. In embodiments of the kind illustrated in FIG. 4, for example, user preference records (106) include data elements comprising priority (406) and user preferences (408). In some exemplary embodiments LSC records (118) include data elements comprising digital content (412), content type (414), target location (416), duration (418), relevant date range (420), and relevant time range (422). In the example embodiment shown in FIG. 4, exemplary PLSC records (120) include data elements comprising digital content (412), duration (418), and user identification (404).

Typical embodiments include downloading (140) the PLSC records (120) through the digital communications network (140) to the user client device (126). In the example illustrated in FIG. 4, the PLSC record includes a user ID field from which will be inferred, by use of a user account record, for example, a network address for the client device for the download. Other embodiments place the network address directly in the PLSC record along with, or instead of, the user ID.

In exemplary embodiments storing LSC typically includes receiving user preferences entered by a user (102) through a browser (104). The browser is any browser, traditional or advanced, implemented upon a personal computer, or upon a personal digital assistant, a hand-held computer, an internet-enabled cellular telephone handset, or any other device capable of implementing a browser.

In other embodiments, storing LSC records includes data mining (110) LSC from vendors' transaction databases (108). Data mining is technology that discovers or predicts patterns of customer behavior based on historical data. By "vendor" is meant any person, entity, or organization providing LSC for downloading to client devices and interleaving into broadcast program content. In this sense, vendors include police organization, fire departments, highway departments, emergency services, and local public service groups, as well as ordinary commercial suppliers of goods and services. Vendors often have very large quantities of transaction data from which can be inferred preferences of broadcast listeners. (In this specification, broadcast listeners are generally referred to as "users.") In some embodiments, demographics from user account records in PLSC servers are used by agreement with vendors to enable vendors to effect data mining for preferences meaningful to the users of the client devices accepting downloads of PLSC.

Turning back to FIG. 2, in exemplary embodiments of the invention creating PLSC records typically includes selecting LSC records in dependence upon the user preferences, the location of the user client device, and the local date and time at the location of the client device. In some embodiments creating PLSC records typically includes selecting LSC records having content types, target locations, and relevant date and time ranges that match, for a user, the user preferences from a user preference record for the user, the location of the user client device associated with the user, and the local date and time at the location of the user client device associated with the user.

In exemplary embodiments of the kind illustrated in FIG. 2, downloading the PLSC records to the user client device typically includes downloading the PLSC to the user client device at the network address for the user client device within the digital communications network, wherein the PLSC so downloaded comprises digital content and duration. In some exemplary embodiments the PLSC records to be downloaded include priority, and downloading the PLSC to the user client device includes downloading the PLSC to the user client device in dependence upon priority, and excluding priority from the downloaded PLSC records. In such embodiments, the priority fields are used in effect to sort the download before the download, so that the PLSC records downloaded are received and stored on the client device in priority order, thus eliminating the need for the priority field in the PLSC records actually downloaded. Embodiments of this kind need simpler and therefore cheaper client devices, because the client device need not select PLSC records for interleaving on the basis of priority. The client devices of this kind need only be smart enough to pick the first PLSC record that will fit the next interleave slot, that is, the first PLSC record in the download (which is pre-sorted by priority) whose duration is equal to or shorter than the next available interleave slot identified in the broadcast schedule.

In typical embodiments downloading the PLSC to the user client device includes downloading the PLSC to the user client device at the address with which the user client device is associated in the digital communications network, wherein the PLSC so downloaded includes digital content, duration, and priority. "Priority" in this context includes single-field indications of priority as well as more complex indications of PLSC record type and content. To the extent that such information is available for use in the client device, the client device is made more sophisticated and therefore more expensive in order to utilize it.

Turning now to FIG. 3, a further example embodiment of the invention is shown to comprise storing more than one indication (139) of the location (116) of the user client device (126) and, associated with each such indication of location of the user client device, the local time (117) when the user client device was at the location. The illustrated example includes calculating (144), in dependence upon the stored indications of location and time, a speed (146) of the user client device and a direction of travel (147) of the user client device.

In some exemplary embodiments, creating PLSC records in dependence upon user preferences, the location of the user client device, and the local date and time at the location of the client device includes creating (122) PLSC records(120) not only in dependence upon the user preferences (106), the location (116) of the user client device, the local date and time (117) at the location of the client device, but also in dependence upon the speed (146) and direction of travel (147) of the user client device. In typical embodiments of this kind, data indications of user preference (408) include indication of relevant area or a radius around the location of the client device that the user prefers to consider relevant for selection of PLSC. LSC records in such embodiments then are selected for inclusion in PLSC by selecting LSC records having target locations (416) within the area preferred by the user. Embodiments that include speed and direction of travel in addition to present location of a client device typically include calculating a calculated area of relevance, by projecting where the client device will probably be for a relevant period of time, the projection accomplished by use of the speed and direction of the client device. Such embodiments typically include selecting LSC records having target locations within the calculated area of relevance (not shown).

As illustrated in FIG. 3, exemplary embodiments of the invention typically include periodically repeating the steps of receiving a location, determining local date and time, creating PLSC records, and downloading the PLSC records to the user client device. Other embodiments of the invention typically include calculating (148), for the step of periodically repeating, a repetition rate (150), wherein the calculating is carried out in dependence upon the speed (146) of the user client device. By repeatedly creating and downloading fresh PLSC, such embodiments maintain within computer memory stores within the client devices the PLSC which is most relevant to the client device's present location as the client devices move from place to place.

From the detailed description set forth above in this specification, readers can see that embodiments of the invention function, for example, as follows. Assume a user has in the user's automobile a client device, an FM radio having an integrated cell phone and microcomputer storing broadcast schedules and PLSC records, the client device coupled through a backchannel on a GSM network, for example, to a PLSC server. The user registered in the user's preferences on the PLSC server that the user prefers to eat lunch at WhatABurger when one is available at midday, that the user is an avid blues guitar player, and that the user loves to collect antiques. The user's registered preferences include an indication that the user's radius of preferred interest is five miles. WhatABurgers along the user's travel route are vendors having stored LSC records in the PLSC server. As the user drives, for example, from Houston to Austin on Highway 290, coming to Brenham, Tex., at noon, the PLSC server downloads to the client device an advertisement with directions to a WhatABurger in Brenham. As the user nears Austin, the PLSC server downloads to the client device advertisements for Austin blues venues, music shops, guitar stores, and antique shops. As the user nears construction areas on the highway, PLSC warnings are downloaded based on LSC records provided by the Texas State Highway Department. As the user nears the location of a thunderstorm crossing the highway, a severe weather warning in a PLSC record is downloaded based upon an LSC record provided by a local weather service.

Interleaving in Client Devices

Figure 5:
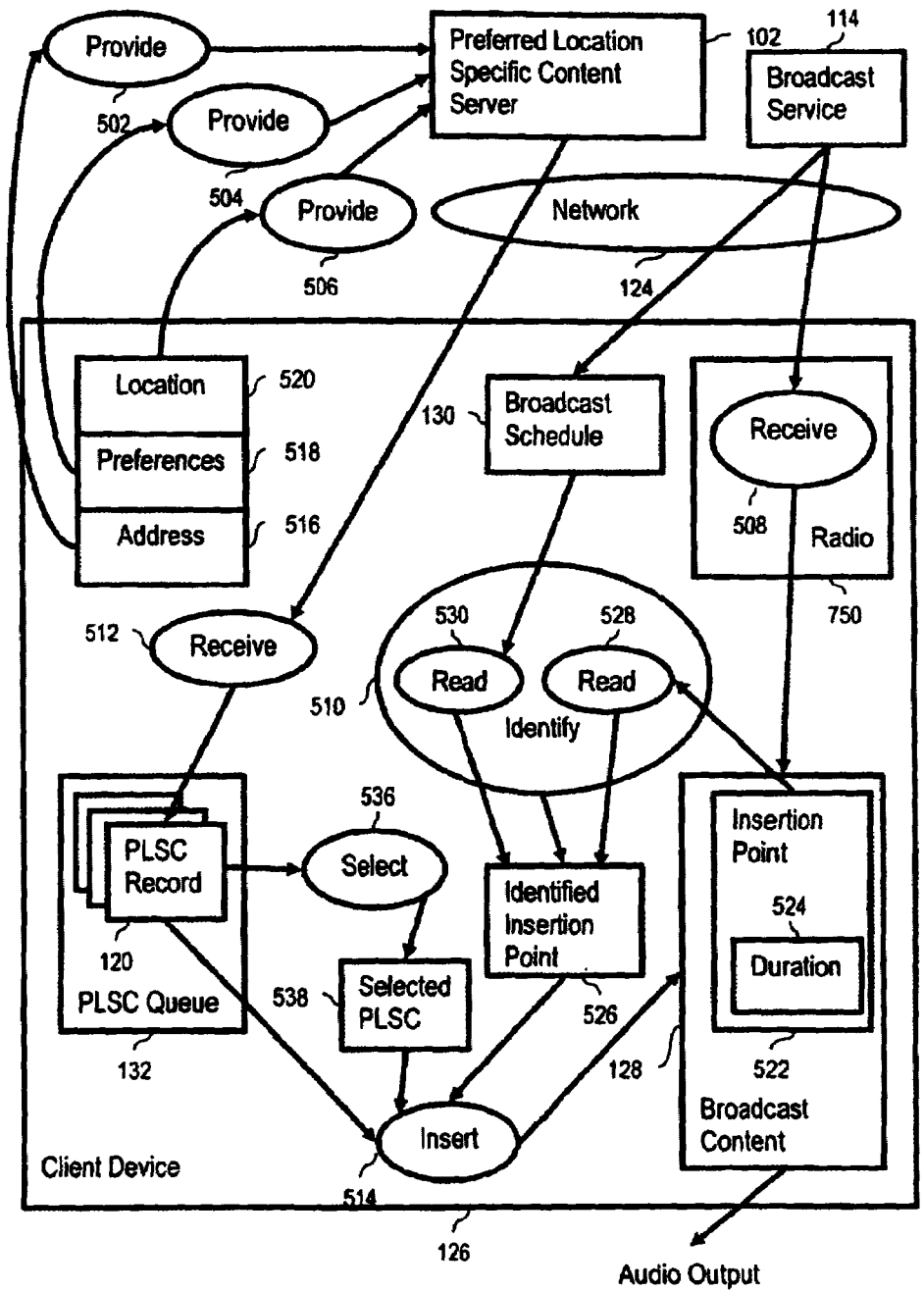
FIG. 5 sets forth a data flow diagram depicting methods of interleaving preferred location specific content into broadcast content.

FIG. 5 sets forth a data flow diagram depicting an exemplary method for interleaving preferred location specific content into broadcast content. The method of FIG. 5 includes providing (506) a location (520) of the client device (126) to the source (102) of preferred location specific content. 'Location' in this context means the physical position of the client device, its latitude and longitude. As mentioned above in this disclosure, it is typically a capability of a digital communications network (124) to provide to a PLSC server (138) a location of any client device coupled to the PLSC server (102) through the network (124). That is, providing a location of a client device is a function of modern wireless network technology in which a client device coupled for wireless data communications automatically communicates with the cells of a network as it travels from cell to cell. Providing a location of a client device according to embodiments of the present invention can include the user's instructing the user's provider of wireless data communications, that is, the digital communications network (124), to make the user's client device location available to the user's source of preferred location specific content. Providing a location of a client device according to embodiments of the present invention can include providing a location of a client device by use of the Global Positioning System or 'GPS.' Client devices according to such embodiments can include a GPS receiver, and such embodiments can include the capability of providing not only the current position of a client device, but also its speed and direction of travel.

The method illustrated in FIG. 5 also includes receiving (508) broadcast content (128) in the client device (126). In typical embodiments, a client device includes automated computing machinery (reference FIG. 1a) that includes a radio (750 on FIG. 1a) such as, for example, an FM radio or a satellite radio, through which the client device receives (508) broadcast content (128).

The method illustrated in FIG. 5 also includes receiving (512) preferred location specific content (120) in the client device (126) at a wireless network address (516). The wireless network address (516) is a wireless network address for the client device (126) on a wireless network (124) across which the client device is coupled for data communications with a source of preferred location specific content such as, for example, a preferred location specific content server (102). The preferred location specific content (120) typically comprises PLSC records created in a content server (102). That is, the PLSC records are created in a content server, created in dependence upon LSC records typically from vendors, user preferences, the location of a client device, and the local date and time at the location of the client device, as described in more detail above in this disclosure.

Receiving (512) preferred location specific content (120) in the client device (126) is carried out in many embodiments of the present invention by receiving PLSC records (120) having a data structure that includes data elements such as, for example, those illustrated at reference (120) on FIG. 4, including particularly some form of digital content (412), such as an audio clip or a text string for text-to-audio conversion, and an indication of the duration of the digital content (418) for use in inserting items of preferred location specific content into broadcast content so that the inserted preferred location specific content does not inappropriately interfere with broadcast content.

In the example of FIG. 5, receiving (512) preferred location specific content (120) includes storing PLSC records in a PLSC queue (132) in RAM or non-volatile computer memory (166, 168 on FIG. 1a) in the client device (126). The PLSC record structure at reference (120) on FIG. 4 includes a userID field (404) and a NetworkAddress field (405), but the userID and network address, optional for processing with content servers, usually are neither needed nor retained for processing of preferred location specific content within client devices according to embodiments of the present invention.

The method of FIG. 5 also includes identifying (510) insertion points (522) for preferred location specific content within the broadcast content (128) and inserting (514) preferred location specific content (120) into broadcast content (128) at the identified insertion points (526). A received broadcast schedule (130) can include data markers for insertion points (526), and identifying insertion points can be carried out by reading (530) the location and duration of insertion points from a received broadcast schedule (130). A broadcast schedule (130) can be received through a backchannel, including, for example, a subcarrier on a broadcast channel or through a separate digital channel provided for that purpose.

Identifying insertion points also can be carried out by reading (528) the location (522) and duration (524) of insertion points from a stream of broadcast content (128). The method illustrated in claim 5 also includes the option of receiving in the mobile client device a broadcast schedule (130) for the broadcast content where the broadcast schedule (130) contains identifications of insertion points for preferred location specific content within the broadcast content, and identifying (510) insertion points (522) for preferred location specific content within the broadcast content (128) includes reading (530) identifications of insertion points from within the broadcast schedule.

Preferred location specific content, in many embodiments of the present invention, is communicated from sources of preferred location specific content to client devices as digital data in packet switched wireless digital networks (reference 124 on FIG. 5). In such embodiments, a source (102) of preferred location specific content will need to know network addresses for client devices, in support of communicating to the client devices preferred location specific content. The method illustrated in FIG. 5 therefore also advantageously includes providing (502) to a source (102) of preferred location specific content the wireless network address (516) for the client device (126).

In typical embodiments, a client device (126) can provide its network address through normal network operations. Consider the operation of the well known network communications suite known as 'tcp/ip.' The name 'TCP/IP' refers to two layers of the OSI protocol stack. The network layer is implemented with the Internet Protocol, hence the initials 'IP.' And the transport layer is implemented with the Transport Control Protocol, referred to as 'TCP.' The two protocols are used together so frequently that they are often referred to as the TCP/IP suite, or, more simply, just 'TCP/IP.' In TCP/IP, TCP client software either owns a fixed IP address as its network address, entered as a client software parameter and retained in non-volatile memory, or the TCP client software configures its network address dynamically by use of a configuration protocol such as, for example, the Dynamic Host Configuration Protocol or 'DHCP.'

In the example of TCP/IP, therefore, a client device (126) can provide its network address automatically, particularly to a content server configured as a web server. More generally, the client device (126), in using wireless network communications protocols, can use automated protocols to provide its network address to sources of preferred location specific content. To the extent that it is advantageous to do so, providing (502) a wireless network address (516) to a source (102) of preferred location specific content can be carried out by a user's communicating the network address to an administrator of a source of location specific content who then enters the network address through a data entry screen as an operating parameter available for use of communications application software (reference 104 on FIG. 1a) on the server side. This discussion identifies several ways to provide (502) to a source (102) of preferred location specific content the wireless network address (516) for the client device (126). Other ways will occur to those of skill in the art, and all such ways are well within the scope of the present invention.

The method illustrated in claim 5 also includes providing (504) user preferences (518) to the source (102) of preferred location specific content. In the method illustrated in claim 5, user preferences (518) are represented by user preference records (106 on FIG. 4) comprising data elements describing user preferences (408), optionally including priority (406). Providing (502) user preferences (518) to a source (102) of preferred location specific content can comprise providing the user preferences through a browser (532 on FIG. 1a) on a personal computer. Providing (504) user preferences (518) to a source (102) of preferred location specific content can comprise providing the user preferences through a microbrowser (534 on FIG. 1a) on a mobile client device such as a personal digital assistant or a network-enabled mobile telephone.

The method illustrated in claim 5 also includes an alternative for selecting (536), in the mobile client device (126), preferred location specific content (120) for insertion into broadcast content. In this alternative example of interleaving PLSC into broadcast content, selecting (536) produces selected PLSC records (538) and the exemplary method includes inserting (514) the selected PLSC into the broadcast content (128). Exemplary embodiments that include selecting (536) preferred location specific content (120) in a client device (126) comprise selecting preferred location specific content in dependence upon duration, relevant date range, and relevant time range, and optionally also in dependence upon priority.

In typically embodiments, an insertion point (522) comprises an insertion point duration (524) during which PLSC can be safely inserted into broadcast content without inappropriately interfering with the broadcast content. PLSC records can comprise data elements for digital content, duration, relevant date range, and relevant time range, and optionally including priority. In embodiments where PLSC records include priority, a client device can sort or index PLSC records on priority, date, time, and duration and then interleave them by inserting them at any particular insertion point for which the next PLSC record in a sorted or indexed queue has a relevant date and time and a duration not too long for the insertion point. That is, the duration of the next PLSC record is equal to or less than the duration of the next insertion point.

In embodiments that do not include indications of priority in PLSC records, there is no need to sort or index on priority. Otherwise, processing in such embodiments is that same as for embodiments that do include priority. Including priority and periodically sorting or indexing on the basis of priority, has advantages, including, for example, giving emergency services an opportunity to break in to a sequence of PLSC by sorting emergency PLSC records to the top of the queue every time it is resorted or reindexed.

It will be understood from the foregoing description that various modifications and changes may be made in the exemplary embodiments of the present invention without departing from its true spirit. The descriptions in this specification are for purposes of illustration only and are not to be construed in a limiting sense. The scope of the present invention is limited only by the language of the following claims.

What is claimed is:

1. A method for interleaving preferred location specific content into broadcast content, the method comprising:
   providing a location of the client device to the source of preferred location specific content;
   receiving broadcast content in the client device;
   receiving preferred location specific content in the client device at a wireless network address;
   identifying insertion points for preferred location specific content within the broadcast content;
   inserting preferred location specific content into broadcast content at the identified insertion points; and
   providing user preferences to the source of preferred location specific content;
   wherein user preferences are represented by user preference records comprising data elements describing user preferences.

2. The method of claim 1 further comprising providing to a source of preferred location specific content the wireless network address for the client device.

3. The method of claim 1 wherein the data elements describing user preferences include priority.

4. The method of claim 1 further comprising receiving in the mobile client device a broadcast schedule for the broadcast content, wherein:
   the broadcast schedule contains identifications of insertion points for preferred location specific content within the broadcast content; and identifying insertion points for preferred location specific content within the broadcast content includes reading identifications of insertion points from within the broadcast schedule.

5. The method of claim 1 further comprising selecting, in the mobile client device, preferred location specific content for insertion into broadcast content.

6. The method of claim 5 wherein selecting preferred location specific content is carried out in dependence upon duration, relevant date range, and relevant time range, and also in dependence upon priority.

7. A system for interleaving preferred location specific content into broadcast content, the system comprising:
 means for providing a location of the client device to the source of preferred location specific content;
 means for receiving broadcast content in the client device;
 means for receiving preferred location specific content in the client device at a wireless network address;
 means for identifying insertion points for preferred location specific content within the broadcast content;
 means for inserting preferred location specific content into broadcast content at the identified insertion points; and
 means for providing user preferences to the source of preferred location specific content wherein user preferences are represented by user preference records comprising data elements describing user preferences.

8. The system of claim 7 further comprising means for providing to a source of preferred location specific content the wireless network address for the client device.

9. The system of claim 7 wherein the data elements describing user preferences include priority.

10. The system of claim 7 further comprising means for receiving in the mobile client device a broadcast schedule for the broadcast content, wherein:
 the broadcast schedule contains identifications of insertion points for preferred location specific content within the broadcast content; and
 means for identifying insertion points for preferred location specific content within the broadcast content includes means for reading identifications of insertion points from within the broadcast schedule.

11. The system of claim 7 further comprising means for selecting, in the mobile client device, preferred location specific content for insertion into broadcast content.

12. The system of claim 11 wherein means for selecting preferred location specific content functions in dependence upon duration, relevant daze range, and relevant time range, and also in dependence upon priority.

13. A computer program product for interleaving preferred location specific content into broadcast content, the computer program product comprising:
 a recording medium;
 means, recorded on the recording medium, for providing a location of the client device to the source of preferred location specific content;
 means, recorded on the recording medium, for receiving broadcast content in the client device;
 means, recorded on the recording medium, for receiving preferred location specific content in the client device at a wireless network address;
 means, recorded on the recording medium, for identifying insertion points for preferred location specific content within the broadcast content;
 means, recorded on the recording medium, for inserting preferred location specific content into broadcast content at the identified insertion points; and
 means, recorded on the recording medium, for providing user preferences to the source of preferred location specific content, wherein user preferences are represented by user preference records comprising data elements describing user preferences.

14. The computer program product of claim 13 further comprising means, recorded on the recording medium, for providing to a source of preferred location specific content the wireless network address for the client device.

15. The computer program product of claim 13 wherein the data elements describing user preferences include priority.

16. The computer program product of claim 13 further comprising means, recorded on the recording medium, for receiving in the mobile client device a broadcast schedule for the broadcast content, wherein:
 the broadcast schedule contains identifications of insertion points for preferred location specific content within the broadcast content; and
 means, recorded on the recording medium, for identifying insertion points for preferred location specific content within the broadcast content includes means, recorded on the recording medium, for reading identifications of insertion points from within the broadcast schedule.

17. The computer program product of claim 13 further comprising means, recorded on the recording medium, for selecting, in the mobile client device, preferred location specific content for insertion into broadcast content.

18. The computer program product of claim 17 wherein the means, recorded on the recording medium, for selecting preferred location specific content functions in dependence upon duration, relevant date range, and relevant time range, and also in dependence upon priority.

* * * * *